(12) United States Patent
Ramasamy et al.

(10) Patent No.: US 12,063,516 B2
(45) Date of Patent: Aug. 13, 2024

(54) METHOD AND APPARATUS FOR ON DEMAND NETWORK SLICE OVERLAY AND OPTIMIZATION

(71) Applicant: Dell Products, LP, Round Rock, TX (US)

(72) Inventors: Suresh K. Ramasamy, Cedar Park, TX (US); Abeye Teshome, Austin, TX (US); Liam B. Quinn, Austin, TX (US); Julius Mueller, Santa Cruz, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 17/502,617

(22) Filed: Oct. 15, 2021

(65) Prior Publication Data
US 2023/0118808 A1  Apr. 20, 2023

(51) Int. Cl.
*H04W 16/04* (2009.01)
*H04W 28/08* (2023.01)

(52) U.S. Cl.
CPC ....... *H04W 16/04* (2013.01); *H04W 28/0942* (2020.05); *H04W 28/0983* (2020.05)

(58) Field of Classification Search
CPC ............. H04W 16/04; H04W 28/0983; H04W 28/0942; H04W 36/22; H04W 72/12
See application file for complete search history.

(56) References Cited

U.S. PATENT DOCUMENTS

| | | | | |
|---|---|---|---|---|
| 7,342,901 B1* | 3/2008 | Zhang | ................... | H04W 76/27 370/329 |
| 2002/0047745 A1* | 4/2002 | Kolanek | ............... | H03F 1/0294 330/149 |
| 2009/0245108 A1* | 10/2009 | Wu | ......................... | H04L 47/29 370/233 |
| 2012/0317069 A1* | 12/2012 | Oono | .................. | G06F 11/3419 706/47 |
| 2013/0136078 A1* | 5/2013 | Bucknell | ............. | H04W 84/047 455/410 |

(Continued)

FOREIGN PATENT DOCUMENTS

WO    WO-2018089417 A1 *  5/2018

*Primary Examiner* — Stephen J Clawson
(74) *Attorney, Agent, or Firm* — Prol Intellectual Property Law, PLLC; H. Kenneth Prol

(57) ABSTRACT

An information handling system executing an on-demand network slice overlay optimization system includes a processor executing the on-demand network slice overlay optimization system to receive wireless network load profile metrics from a regional edge device and the endpoint load profile metrics; receive core metrics from a radio access network (RAN) service provider descriptive of the load capacity of a core network to provide data throughput at a given time; determine whether the real-time data load demand of the grouped plurality of endpoint devices can be provisioned to the load capacity described in the core metrics; and provide instructions to dynamically adjust network slices at the regional edge device to provide for any changes in the real-time data load demand based on an elastic client business policy enforced at the regional edge device for wireless connectivity data for the grouped plurality of endpoint devices.

20 Claims, 5 Drawing Sheets

(56) References Cited

U.S. PATENT DOCUMENTS

| | | | |
|---|---|---|---|
| 2016/0164738 A1* | 6/2016 | Pinski | H04L 43/0888 709/224 |
| 2017/0251341 A1* | 8/2017 | Frost | H04L 12/189 |
| 2018/0006962 A1* | 1/2018 | Barth | H04L 47/726 |
| 2020/0186449 A1* | 6/2020 | Tofighbakhsh | H04L 43/04 |
| 2021/0194724 A1* | 6/2021 | Lee | H04J 14/0294 |
| 2021/0368514 A1* | 11/2021 | Xing | H04L 41/5019 |
| 2022/0132368 A1* | 4/2022 | Paczkowski | H04W 24/02 |
| 2022/0350675 A1* | 11/2022 | Navali | H04L 47/781 |
| 2022/0408333 A1* | 12/2022 | Ryu | H04L 67/146 |

* cited by examiner

METHOD AND APPARATUS FOR ON DEMAND NETWORK SLICE OVERLAY AND OPTIMIZATION

FIELD OF THE DISCLOSURE

The present disclosure generally relates to network slicing within a WLAN or WWAN network. The present disclosure more specifically relates to dynamically changing the network slices allocated for use by an edge device information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include on-demand network slice overlay optimization system to dynamically adjust the network slices provided to any given network or region of a network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
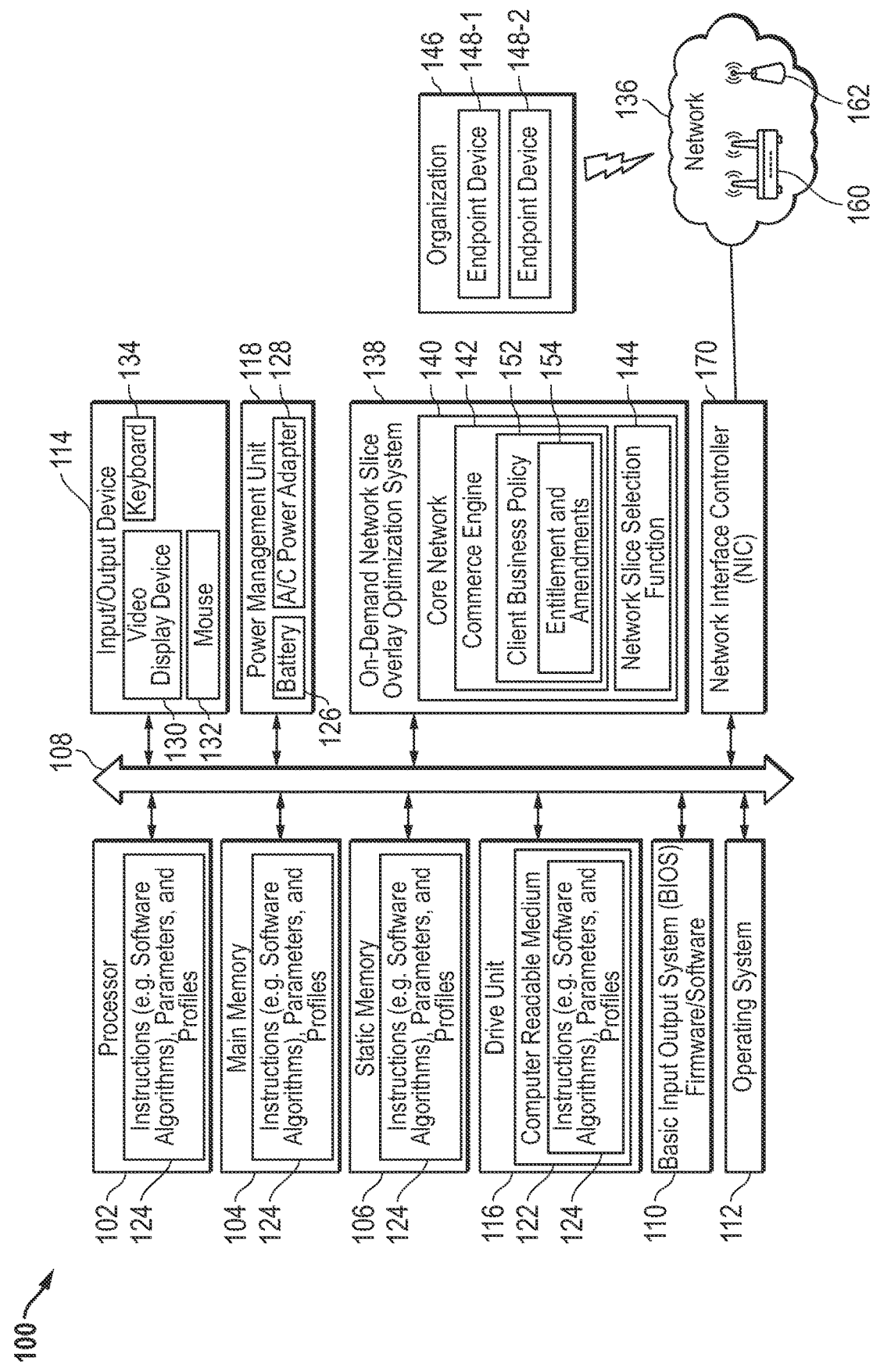
FIG. 1 is a block diagram illustrating a network slicing optimization system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the abilities of these mobile information handling systems to receive and transmit various signals simultaneously increase in demand. Further, enterprise managed groups of mobile information handling systems operating as user equipment mobile endpoint device (UEs) may utilize persistent or near-persistent wireless connectivity for monitoring and management. Information handling systems including those that are mobile endpoint devices in embodiments of the present disclosure address this need by employing a plurality of antenna systems for communication via wireless links operating on a variety of radio access technologies (RAT). For example, a mobile information handling system operating as an endpoint device in an embodiment of the present disclosure may employ separate antenna systems for Wi-Fi signals, wireless wide area network (WWAN) signals, Bluetooth signals, and wireless local area network (WLAN) signals. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, emerging 5G standards, or WiMAX, small cell WWAN, and the like. Wi-Fi and WLAN signals in embodiments of the present disclosure may include wireless links adhering to standards such as, for example, IEEE 802.11 WiFi, IEEE 802.11ad WiGig, IEEE 802.15 WPAN, and IEEE 802.11ax-2021 (e.g., WiFi 6 and 6E, 6 GHz technologies). In other aspects, several antenna systems may be available for each RAT to enable aggregated data communications such as via plural multiple in, multiple out (MIMO) streams to enhance data bandwidth or reliability.

Cloud-based services are an increasing part of operating an information handling system over such networks using these wireless protocols and links. The services provided by cloud-based services may be used to provide persistent connectivity for endpoint devices. In the embodiments described herein, these endpoint devices may be grouped together by a region, an organization, or a subgroup of any organization that defines specific end-point device groupings. By way of example, a college or university may be an organization that is part of a regional grouping of endpoint devices. The college or university may also break a number of endpoint devices by organization or departments such as an athletic organization within the college or university or a physics department at that university or college. In order to provide this persistent connectivity, a wireless access provider or a radio access network (RAN) provider (e.g., an internet service provider (ISP), a cellular provider, or the enterprise managed RANs) may allocate a network slice used to fulfill, at least, the data throughput requirements of these groups of endpoint devices or organizations that these endpoint devices fall under. In these embodiments, the organizations may contract with the wireless access provider(s) to be provided a certain level of network slices and capacity in order to maintain this persistent connectivity with the network. However, the data throughput and other quality-of-service (QoS) requirements for these organizations may change over time. For example, a planned athletic event such as a football game may occur thereby increasing the network requirements at the athletic department or the college or university generally. This increase in network requirements (e.g., data throughput and data channel allocation) may depend on the actual number of participants as well as the data throughput (and other QoS requirements at each of the endpoint devices. However, the ability to shift from one level of data throughput to another cannot be determined in real-time for such an event without knowing the data throughput requirements at each endpoint device. Without this information, the wireless access provider(s) may not know when and to what extent the network slices and capacity provided to the organization or region is to be increased or decreased.

The present specification describes a system and method to provide on-demand network slice overlaying and optimization to regional and/or endpoint-group loads. The autonomous adjustments made to the network slice overlaying and optimization may be based on an endpoint-to-core, real-time visibility and telemetry access provided to a commerce engine located on the network core. The commerce engine located on the network core may receive this endpoint-to-core, real-time visibility and telemetry data from each endpoint device (e.g., via an edge device) as well as network capacity data from the wireless access providers in order to dynamically adjust the network slices and capacity provided to the groups or regions and adjust a client business policy entered into by the group or organization with the wireless access providers.

The present specification describes a network slicing optimization system that includes an on-demand network slice overlay optimization system that receives load profile metrics from a regional edge device. In this embodiment, the load profile metrics include data descriptive of a real-time data load demand of a plurality of endpoint devices operating within the infrastructure monitored by the regional edge device. The on-demand network slice overlay optimization system also receives core metrics from a RAN service provider descriptive of the load capacity of a core network to provide data throughput at a given time. With this data, the on-demand network slice overlay optimization system determines whether the real-time data load demand can be provisioned by the load capacity described in the core metrics then dynamically adjusts network slices and their capacity at the regional edge device to provide for any changes in the load demand based on a client business policy provided by the regional edge device. This allows flexibility in the client business policy defining the resources to be provided to the endpoint devices at any given time. By knowing the load profile metrics from each endpoint device via an edge device, the network core executing the on-demand network slice overlay optimization system can better provide for the persistent connectivity requirements for the organizations using the services provided by the wireless services providers.

In an embodiment, an organization may track and charge or be charged for additional network slices and capacity in a region according to real-time adjustments. These adjustments may be related to events for example, where capacity spikes occur or for any generally increasing capacity needs depending on changes in the endpoint devices utilizing the enterprise mobile networks.

FIG. 1 illustrates an on-demand network slice overlay optimization system 138 on an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a backend server (e.g., blade server or rack server) or other server and may represent any number of edge devices and/or endpoint devices 148-1, 148-2. In an embodiment, the on-demand network slice overlay optimization system 138 may be located on an edge device that may be the information handling system 100. Each of the endpoint devices 148-1, 148-2 may be referred herein as information handling systems and may also include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. Endpoint devices 148-1, 148-2 are described further in connection with FIG. 3. The endpoint devices 148-1, 148-2 may be any personal computer, mobile device (e.g., personal digital assistant (PDA) or smart phone), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the on-demand network slice overlay optimization system 138 can be implemented using electronic devices that provide voice, video or data communication. For example, an on-demand network slice overlay optimization system 138 may be any mobile or other computing device capable of executing a set of instructions (sequential or otherwise) that specify actions to be taken by that machine. Further, while an information handling system 100 is illustrated, the term "system" shall also be taken to include any collection of systems or sub-systems that individually or jointly execute a set, or multiple sets, of instructions to perform one or more computer functions.

The hardware of the information handling system forming the information handling system 100 can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices 114, such as a keyboard 134, a mouse 132, a video/graphic display 130, or any combination thereof. The information handling system 100 can also include one or more buses 108 operable to transmit data communications between the various hardware components described herein. Portions of an information handling system 100 may themselves be considered information handling systems that operate to perform the methods accomplished by the information handling system 100 described herein.

The information handling system 100 can include devices or modules that embody one or more of the devices or execute instructions for the one or more systems including the on-demand network slice overlay optimization system 138 and modules described herein, and operates to perform one or more of the methods described herein. The information handling system 100 may execute code instructions 124 of software or firmware that may operate on servers or systems, remote data centers, or on-box in individual client information handling systems according to various embodiments herein. In some embodiments, it is understood any or all portions of code instructions 124 may operate on a plurality of the information handling system 100 including, for example, the on-demand network slice overlay optimization system 138.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of, for example, the on-demand network slice overlay optimization system 138, and drive unit 116 (volatile (e.g., random-access memory, etc.), nonvolatile (read-only memory, flash memory etc.) or any combination thereof).

In an embodiment, the edge device information handling system 100 may include a network interface card (NIC) 170 disposed within the information handling system 100, on a main board of the endpoint information handling system 100, integrated onto another component such as processor 102, in another suitable location, or a combination thereof. The NIC 170 may provide a wired interface between the information handling system 100 and other resources on the network 136. In other embodiments, the NIC 170 may also be a wireless adapter as described further in embodiments herein and provide a wireless interface between information handling system 100 and other resources in network 136.

The on-demand network slice overlay optimization system 138 may gather various metrics and data from each of the endpoint devices 148-1, 148-2 as well as load profile metrics from a plurality of the edge devices serving an enterprise mobile network or mobile networks accessible to enterprise systems of an organization 146 and whose connectivity is managed by the organization 146. In the embodiments herein, each of the endpoint devices 148-1, 148-2 may be grouped into an organization 146. This organization 146 may be a physical arrangement of endpoint devices 148-1, 148-2 grouped together in a location such as a college computer lab. Alternatively, an organization 146 may be an association of a plurality of endpoint devices 148-1, 148-2 that use a similar path to access a network such as a college or a university. Still further, the organization 146, in an embodiment, may be a group of endpoint devices 148-1, 148-2 operating within a region such as each endpoint device 148-1, 148-2 that accesses a cellular network via a base station or number of base stations within a region. In an embodiment, the organization 146 may have a contract with a wireless service provider (RAN service provider) to be provided a certain level of wireless resources via the assignment of a network slice to that organization 146. In an example this contract may define a client business policy 152 where, at least, a minimum level of wireless resources (e.g., a level of data throughput) is provided to the organization 146 and the endpoint devices 148-1, 148-2 operating under that organization 146. It is via this RAN service provider that the on-demand network slice overlay optimization system 138 gathers the various metrics and data from each of the endpoint devices 148-1, 148-2.

In order to communicate with the on-demand network slice overlay optimization system 138 in order to provide the load profile metrics, each of the endpoint devices 148-1, 148-2, in an embodiment, may include a network interface device such as a wireless interface adapter that can provide connectivity to a network 136, e.g., a wide area network (WAN), a local area network (LAN), wireless local area network (WLAN), a wireless personal area network (WPAN), a wireless wide area network (WWAN), or other network where the on-demand network slice overlay optimization system 138 resides. In an embodiment, the WAN, WWAN, LAN, and WLAN may each include an access point 160 or base station 162 used to operatively couple the endpoint devices 148-1, 148-2 to a network edge device such as the information handling system 100 where the on-demand network slice overlay optimization system 138 resides. In a specific embodiment, the network 136 may include macro-cellular connections via one or more base stations 162 or a wireless access point 160 (e.g., Wi-Fi or WiGig), or such as through licensed or unlicensed WWAN small cell base stations.

In an embodiment, information handling system 100 as described in similar structure serve a one or more endpoint devices similar to 148-1, 148-2. The information handling system as an endpoint device 148-1, 148-2 is shown in further detail as endpoint device 348 below in FIG. 3. The NIC 170 may be a wireless adapter to provide wireless connectivity to wireless network 136 for either an endpoint device or even the information handling system 100 of FIG. 1 that may host some or all of on-demand network slice overlay optimization system 138. Connectivity may be via wired or wireless connection from the NIC 170 for information handling system 100 hosting on-demand network slice overlay optimization system 138 or for endpoint devices 148-1, 148-2 through the network 136 and to the information handling system 100 with on-demand network slice overlay optimization system 138 in an embodiment. The NIC 170 as a wireless interface adapters for information handling system 100 or for the endpoint devices 148-1, 148-2 may include one or more radio frequency (RF) subsystems with transmitter/receiver circuitry, modem circuitry, one or more antenna front end circuits, one or more wireless controller circuits, amplifiers, antennas and other circuitry of the RF subsystems such as one or more antenna ports used for wireless communications via multiple radio access technologies (RATs). Each of these RF subsystems may communicate with one or more wireless technology protocols. The RF subsystems may contain individual subscriber identity module (SIM) profiles for each technology service provider and their available protocols for any operating subscriber-based radio access technologies such as cellular LTE communications.

Figure 3:
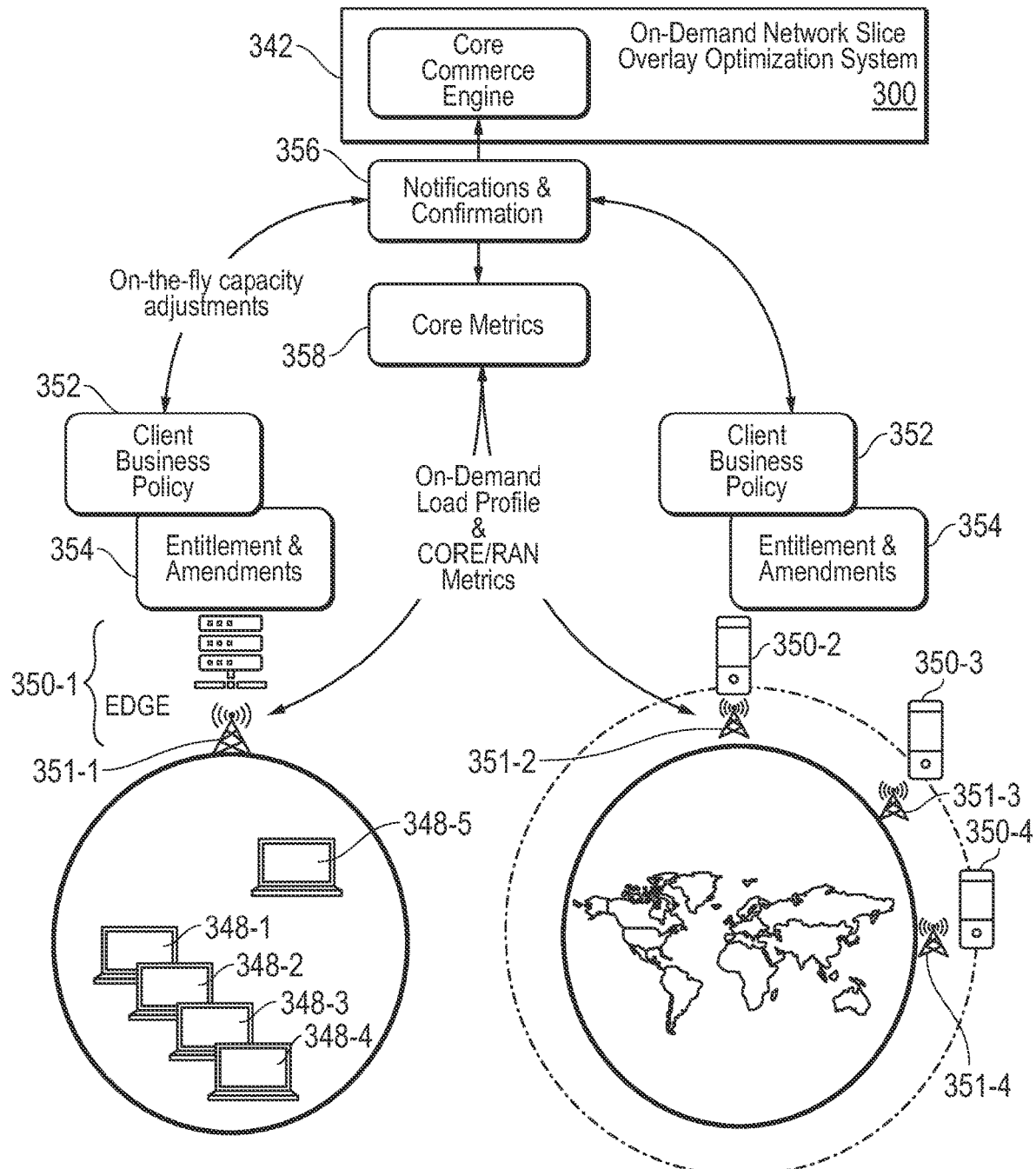
FIG. 3 is a block diagram illustrating data transmissions between an on-demand network slice overlay optimization system and an edge device with its endpoint devices of a network slicing optimization system according to an embodiment of the present disclosure.

Each of the endpoint devices 148-1, 148-2 may include a wireless interface adapter as described in FIG. 3. These NIC 170 having a wireless interface adapters, also known as a wireless interface device, may also include one or more antennas which may include any number of tunable antennas for use with the system and methods disclosed herein. Additional antenna system modification circuitry may also be included with the wireless interface adapter to implement coexistence control measures via an antenna controller. In some aspects of the present disclosure, the wireless interface adapter may operate two or more wireless links to operatively couple each of the endpoint devices 148-1, 148-2, concurrently, to a plurality of networks 136 such as a WWAN or a WLAN. In a further aspect, the wireless interface adapter may operate the two or more wireless links with a single, shared communication frequency band such as with the 5G standard relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas or antennas may be capable of operating at a variety of frequency bands. In a specific embodiment described herein, the shared, wireless communication band may be transmitted through a plurality of antennas used to operate in an N×N MIMO array configuration with the edge device 150 where multiple antennas are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands.

In other aspects, the endpoint devices 148-1, 148-2 operating as mobile information handling systems similar to the information handling system 100 of FIG. 1 may operate a plurality of wireless interface adapters 120 for concurrent radio operation in one or more wireless communication bands. The plurality of wireless interface adapters 120 may further share a wireless communication band or operate in nearby wireless communication bands in some disclosed embodiments. Further, harmonics and other effects may impact wireless link operation when a plurality of wireless links are operating concurrently as in some of the presently described embodiments. The radio transmission or reception operates under the wireless interface adapter made to execute an antenna selection algorithm and potentially make antenna system adjustments according to present disclosure. In an embodiment, any of the antennas may operate as dual band antennas that transceive at 2.4 GHz and 5 GHz, 2.4 GHz and 6 GHz, or 5 Ghz and 6 Ghz for example.

The wireless interface adapter of the endpoint devices 148-1, 148-2 may operate in accordance with any wireless data communication standards to communicate with the information handling system 100 via the edge device. To communicate with a wireless local area network (WLAN) for example, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, or similar wireless standards may be used. The wireless interface adapters may be used to connect to any combination of macro-cellular wireless connections including 2G, 2.5G, 3G, 4G, 5G or the like from one or more RAN service providers in order to communicate with the information handling system 100. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 136 may be based on the radio access network (RAN) standards that implement, for example, eNodeB or gNodeB hardware connected to mobile phone networks (e.g., cellular networks) used to communicate with the information handling system 100 via the edge device. In the example embodiment, the endpoint devices 148-1, 148-2 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end of the endpoint devices 148-1, 148-2 may operate on a licensed WWAN wireless radio with authorization for subscriber access to a wireless service provider on a carrier licensed frequency band.

The wireless interface adapter can represent an add-in card, wireless network interface module that is integrated with a main board of the information handling system or integrated with another wireless network interface capability, or any combination thereof. In an embodiment the wireless interface adapter may include one or more radio frequency subsystems including transmitters and wireless controllers for connecting via a multitude of wireless links. In an example embodiment, an information handling system 100 may have an antenna system transmitter for 5G small cell WWAN, Wi-Fi WLAN or WiGig connectivity and one or more additional antenna system transmitters for macro-cellular communication. The RF subsystems include wireless controllers to manage authentication, connectivity, communications, power levels for transmission, buffering, error correction, baseband processing, and other functions of the wireless interface adapter.

As described herein, the on-demand network slice overlay optimization system 138 may gather load profile metrics including data descriptive of a real-time data load demand of the plurality of endpoint devices 148-1, 148-2 operating within the infrastructure monitored by the regional edge device information handling system 100. Additionally, the on-demand network slice overlay optimization system 138 may gather core metrics from a RAN service provider descriptive of the load capacity of a core network to provide data throughput at a given time.

The on-demand network slice overlay optimization system 138 may be operatively coupled to an organization that includes the number of endpoint devices 148-1, 148-2 via a network 136 as described herein. As described herein, the organization 146 may be any structured arrangement of connected endpoint devices 148-1, 148-2. By way of example, an organization may include a university or college that services a plurality of endpoint devices 148-1, 148-2. In this example embodiment, the university or college may have its own local server or an edge device that may be shown as information handling system 100 that operatively couples the endpoint devices 148-1, 148-2 and executes the on-demand network slice overlay optimization system 138. Execution of on-demand network slice overlay optimization system 138 may be distributed among plural information handling systems 100 in other embodiments, for example at an edge device in part as well as at a remote server in the cloud. In another example embodiment, the organization 146 may be a department within a college or university such as a physics department. In this example, the organization 146 may service a number of endpoint devices 148-1, 148-2 affiliated with the physics department of the university or college and may include its own server that is operatively coupled to the on-demand network slice overlay optimization system 138 via the edge device information handling system 100. In yet another example embodiment, the organization 146 may be a region in which a cellular company services a group of mobile endpoint devices 148-1, 148-2 via, for example, a base station. In this embodiment, the base station operated by the cellular RAN may operatively couple the mobile endpoint devices 148-1, 148-2 to the on-demand network slice overlay optimization system 138 on an edge information handling system 100 via the base station. The present specification, therefore, contemplates that the organization 146 may provide an operative connection for the endpoint devices 148-1, 148-2 to connect to the on-demand network slice overlay optimization system 138 operating on one or more servers or edge devices in management of the enterprise mobile network or accessible networks. As described in FIG. 3, some aspects of the system disclosed herein may reside at and be executed by the one or more endpoint devices 148-1, 148-2 such as a load profile metrics rules-based or heuristics engine to report endpoint device load capacity needs. Such reporting may be made to an enterprise management system operating on enterprise servers or enterprise accessible edge devices used by organization 146 to manage its endpoint devices 148-1. The enterprise management system may be, for example, a Dell Optimizer® system that incorporates the on-demand network slice overlay optimization system 138 or interfaces with the same.

In an embodiment, the information handling system 100 operating as an edge device may be any hardware that provides an entry point into a core network of, for example, a network service provider. Examples of edge device information handling systems 100 may include routers, routing switches, integrated access devices (IADs), multiplexers, and wide area network (WAN) access devices. In an embodiment, the edge device 150 may form part of the on-demand network slice overlay optimization system 138. Because the on-demand network slice overlay optimization system 138 may operate in a cloud environment, the physical hardware and software executed by that hardware may be distributed throughout a network 136 but allowed to operate together to perform the methods described herein. In the embodiment shown in FIG. 1, the on-demand network slice overlay optimization system 138 and edge device information handling system 100 cooperate to operatively couple the organization 146 with its endpoint devices 148-1, 148-2 to the distributed on-demand network overlay optimization system 138 in an embodiment.

The on-demand network overlay optimization system 138 may be any firmware, hardware, and/or software that dynamically directs the RAN to adjust network slices provided at the edge device information handling system 100 to provide for any changes in the load demand from the endpoint devices 148-1, 148-2 at the organization 146. In the embodiments herein, these changes in the network slices provided are based on a client business policy associated with the organization 146 (e.g., budget) and RAN provider and is further based on load profile metrics and core metrics received at the on-demand network slice overlay optimization system 138. In an embodiment, the on-demand network overlay optimization system 138 may operate a core network 140 and multiple infrastructure components of the core network 140 that facilitate the operation of the on-demand network overlay optimization system 138 by coordinating the reception and transmission of the load profile metrics and core metrics described herein. In an embodiment, the on-demand network overlay optimization system 138 may receive a load profile from an edge device information handling system 100 operating above the organization 146 to monitor or manage endpoint devices 148-1, 148-2 and gathering the data load requirements for each of the endpoint devices 148-1, 148-2 from a server, for example, of the organization 146. Because the data load represented in the load profile metrics may change or fluctuate, the on-demand network overlay optimization system 138 may use this data, in part, to determine the network slices to provide to the organization 146 at any given time for the one or more edge device information handling system 100. The network slice assignment may be adjusted via instructions to network slice selection function (NSSF) 144 operating at the network core of, for example, a 5G NR RAN or a 4G LTE RAN.

By way of example, the organization 146 may be an athletic department of a university. In this example, the athletic department may have a certain number of static endpoint devices 148-1, 148-2 that are serviced by the third-party service provider which typically requires a certain data load under normal operating conditions. This data load may fluctuate over the day, but may still be within a static range of data load requirements. However, occasionally, additional endpoint devices 148-1, 148-2 may be added to the organization 146. In some examples, these new and original endpoint devices 148-1, 148-2 may be serviced by the organization 146 when an athletic event is occurring or when an emergency incident has occurred. Here, these original endpoint devices 148-1, 148-2 may operatively be coupled to the wireless services provided by the organization 146 (i.e., the athletic department). In these situations, the data load represented in the load profile metrics may increase significantly. In the example where an athletic event is occurring, the data load may be anticipated by, for example, a detected number of tickets sold to the event. Other data may be provided by each of the endpoint devices 148-1, 148-2 and the edge devices 150 by monitoring the applications being executed on the endpoint devices 148-1, 148-2 (e.g., video streaming applications, email applications, etc.) Even with this data, the data load may change as the weather changes and especially where extreme weather occurs thereby reducing the number of original endpoint devices 148-1, 148-2 being wirelessly coupled to the services provided by the organization 146. In these situations, the data load may be significantly decreased as the number of endpoint devices 148-1, 148-2 using the organization's 146 wireless services decreases. Here, what was once anticipated as a spike in needed data throughput and network slice allocation may be actually been a reduction in those resources. In other situations, the opposite may occur when the number of endpoint devices 148-1, 148-2 operatively coupled to the wireless services of the organization 146 is more than was anticipated by the available (e.g., pre-event) data. These changes in anticipated and actual data throughput and channel resource requirements may all be anticipated and reflected, in real-time, in the load profile metrics provided to the on-demand network overlay optimization system 138. Thus, the load profile metrics may not only reflect anticipated data loads (e.g., scheduled athletic games) but also reflects real-time actual data loads realized at the organization 146. Again, as described herein, the organization 146 may be any organization that services any number of endpoint devices 148-1, 148-2 and may include a region of a country that a base station or number of base stations of a cellular network service. In an embodiment, the load profile metrics includes data related to the applications being executed on each of the endpoint devices 148-1, 148-2 as well.

In this example embodiment, the type of applications being executed by each of the endpoint devices 148-1, 148-2 may be reported to the on-demand network slice overlay optimization system 138 used to determine the data load and data channels necessary to service all of the endpoint device 148-1, 148-2 or devices. Continuing with the example where the organization 146 is an athletic department of a university, the endpoint devices 148-1, 148-2 may be executing one or more of a differing type of applications including email applications, video streaming applications, video conferencing applications, gaming applications, among others. Because each of these different types of applications being executed on the endpoint devices 148-1, 148-2 may require different data throughput, this data may form part of the load profile metrics sent by each of the endpoint devices 148-1, 148-2 to be received by the on-demand network slice overlay optimization system 138.

The core network 140 associated with the on-demand network slice overlay optimization system 138 may also facilitate the execution of a commerce engine 142. The commerce engine 142 may reside on the core network 140 or may be distributed across the cloud network 136 and may be executable software that determines whether the real-time data load demand at the endpoint devices 148-1, 148-2 can be provisioned by the load capacity described in the core metrics under one or more client business policies 152. These core metrics may be received from a RAN service provider at, in an example embodiment, a telecommunication business unit (TBU) of the core network 140 descriptive of the load capacity of a core network to provide data throughput at a given time. In an embodiment the core network 140 may be part of a computer network that interconnects the on-demand network slice overlay optimization system 138 and its on-demand network overlay optimization system 138 with a third-party service RAN provider such as a cellular network provider and/or an internet service provider. These third-party RAN service providers may provide up-to-date data related to the network infrastructure and available load capacity on the RAN network 136.

In an embodiment the client business policy 152 enforced by commerce engine 142 may define the services to be provided to the organization 146 and may include agreements between the organization 146 and the RAN provider. In an embodiment, the client business policy 152 may define whether the agreement between the organization 146 and the RAN provider is a static client business policy or an elastic client business policy. A static client business policy would include a description that the organization 146 is to be provided a static level of data throughput and data channels provided thereto. In this example, the static level may set a maximum and minimum level of resources provided to the organization 146 that defines a maximum and minimum level of data throughput and data channels provided to the organization 146. In this embodiment, the organization 146 may notify the on-demand network slice overlay optimization system 138 of an increase in a need for data throughput and data channels in real time. In an embodiment, this increase may exceed the maximum level of data throughput and data channels as defined in the client business policy 152. Where this occurs, the on-demand network slice overlay optimization system 138 may review the client business policy 152 and compare the client business policy with the available core metrics and resources available at the RAN to determine whether additional resources (e.g., network slices) are available for use by the organization 146. Where there are no more network slices available, the on-demand network slice overlay optimization system 138 may send a notice to the organization 146 that the load profile metrics cannot be met but that there is additional available data throughput and data channels at the RAN. The client may then later change the terms of the client business policy 152 but at this time the on-demand network slice overlay optimization system 138 does not instruct the NSSF 144 at the network core to increase the network slices allocated to and on behalf of the organization 146.

In another embodiment, the client business policy 152 enforced by the commerce engine 142 may define a client business policy between the organization 146 and the RAN provider that is an elastic client business policy 152. In this embodiment, an elastic client business policy 152 may define a base level of data throughput and data channels provided to the organization 146 but with an option to increase the data throughput and data channels provided to the organization 146 by the assignment of more network slices to the organization 146 at the RAN service provider as well as the assignment of additional new broadband resources such as through the operative wireless coupling of additional base stations (e.g., 4G LTE protocols) or access points (e.g., WLAN protocols) to the organization. In an embodiment, the on-demand network slice overlay optimization system 138 may instruct the NSSF 144 at the network core to increase the network slices allocated to and on behalf of the organization 146. In an embodiment, a mobility management entity (MME) may be used to activate and deactivate wireless links with specifically identified (e.g., by eSIM) endpoint devices 148-1, 148-2 within an organization and authorize access to one of a plurality of available serving gateways (e.g., packet data gateway placing data packets in a format to be sent to a backhaul) to provision these additional new broadband resources as well.

In the context of the example presented herein with the athletic department, as the athletic event occurs, the number of endpoint devices 148-1, 148-2 may increase with new or original endpoint devices 148-1, 148-2 being added to the group of endpoint devices 148-1, 148-2 under the organization 146. Again, the increased number of endpoint devices 148-1, 148-2 may require more data throughput and data channels provided by the RAN service provider based on the increase in resources at the organization 146 and presented to the on-demand network slice overlay optimization system 138 by the edge device 150. Again, the elastic client business policy 152 may allow for the additional increase in network slices and the on-demand network slice overlay optimization system 138 may provide instructions to the network core for the NSSF 144 to determine how to increase the network slices and send a request to the RAN service provider to increase the network slices. This is based on the confirmation that the client business policy 152 allows for it and the core network 140 has capacity to provide those additional resources. In an embodiment, the NSSF 144 may select a network slice instance defining specific versions or replicas of each network function to be used in order to process data packets transceived with one or more endpoint devices 148-1, 148-2 of an organization and are assigned to a specifically identified network slice. The on-demand network slice overlay optimization system 138 may thus, add (or subtract) additional 5G capacity and baseband wireless links or portions thereof in some embodiments. In other embodiments, the on-demand network slice overlay optimization system 138 can even ensure instructions to the enterprise mobile network or service provider to add wireless links for slices in other additional wireless protocols under an elastic client business policy 152 if presented and activated. The client business policy 152 may allow for the increase in network slices allocated to the organization 146 and may also include a cost associated with the allocation of those network slices to the organization 146. Thus, the costs associated with providing the endpoint devices 148-1, 148-2 with wireless services may be maintained at a certain level and only increased when necessary to increase the network slices allocated for the organization 146 in an embodiment.

If and when the number of endpoint devices 148-1, 148-2 decreases, the same process may be initiated where the on-demand network slice overlay optimization system 138 receives load profile metrics from the endpoint devices 148-1, 148-2 and edge devices 150 at the organization 146 that indicates that the number of network slices allocated to the organization 146 can be decreased. Again, the client business policy 152 is reviewed by the on-demand network slice overlay optimization system 138 and, based on the load profile metrics, in real-time, reduce the network resources to the organization 146. Such a reduction of resources allows the costs associated with the operation of the organization 146 to be reduced due to the reduction in resources consumed by the organization 146 at the RAN service provider.

Whether the network slices allocated to the organization 146 is increased or decreased by the network slice selection function 144 per the operation of the commerce engine 142, the client business policy 152 may be amended. In an embodiment, the client business policy 152 is amended by the on-demand network slice overlay optimization system 138 to reflect new or changed entitlement and amendments 154 of the client business policy 152. These entitlement and amendments 154 may log the date and time of the amendments to the client business policy 152, the amount to which the data throughput and data channels provided for the organization 146 via the RAN service provider has been changed, the data throughput and data channels the organization 146 is entitled to receive, and the costs associated with any changes to the data throughput and data channels provided to the organization 146. Additional data may be included in the entitlement and amendments 154 and the present specification contemplates that this additional data may be included to inform the organization 146 of any changes to the services and what level of services the organization 146 is entitled to receive.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device or other input/output devices 114, and other components that may require power when a power button has been actuated by a user. In an embodiment, the PMU 118 may monitor power levels and be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

The information handling system 100 may include one or more of an operating system (OS) 112, and basic input/output system (BIOS) firmware/software 110 or application programs that may be executable instructions 124 executed at any processor 102 and stored at one or more memory devices 104, 106, or 116. BIOS firmware/software 110 functions to initialize the information handling system 100 on power up, to launch an OS 112, and to manage input and output interactions between the OS 112 and the other elements of information handling system 100. In a particular embodiment, BIOS firmware/software 110 resides in memory 104, and include machine-executable code that is executed by processor 102 to perform various functions of information handling system 100 as described herein. In another embodiment (not illustrated), application programs and BIOS firmware/software 110 reside in another storage medium of the information handling system 100. For example, application programs and BIOS firmware/software 110 can reside in drive 116, in a ROM (not illustrated) associated with the information handling system 100, in an option-ROM (not illustrated) associated with various devices of the information handling system 100, in a storage system (not illustrated) associated with network channel of a wireless interface adapter 120, in another storage medium of the information handling system 100, or a combination thereof. Executable code instructions 124 for application programs and BIOS firmware/software 110 can each be implemented as single programs, or as separate programs carrying out the various features as described herein. In an embodiment, the information handling system 100 may include an operating system 112 to operatively communicate with any number of endpoint devices 148-1, 148-2.

The information handling system 100 can include a set of instructions 124 that can be executed to cause the computer system to perform any one or more of the methods or computer-based functions disclosed herein. For example, instructions 124 may execute an on-demand network slice overlay optimization system 138 with its network slice selection function 144, various software applications, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 and antenna controller 140 to perform the processes described herein. Similarly, main memory 104 and static memory 106 may also contain a computer-readable medium for storage of one or more sets of instructions, parameters, or profiles 124. The disk drive unit 116 or static memory 106 also contain space for data storage. Further, the instructions 124 may embody one or more of the methods or logic as described herein. For example, instructions relating to the network slice selection functions 144 as described in the embodiments herein may be stored in a static memory 104. In a particular embodiment, the instructions, parameters, and profiles 124 may reside completely, or at least partially, within the main memory 104, the static memory 106, and/or within the disk drive 116 during execution by the processor 102 or an antenna controller 140 of information handling system 100. The main memory 104 and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The network slice selection function 144, the on-demand network slice overlay optimization system 138 and the drive unit 116 may include access to a computer-readable medium 122 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an on-demand network slice overlay optimization system 138 may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the on-demand network slice overlay optimization system 138. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
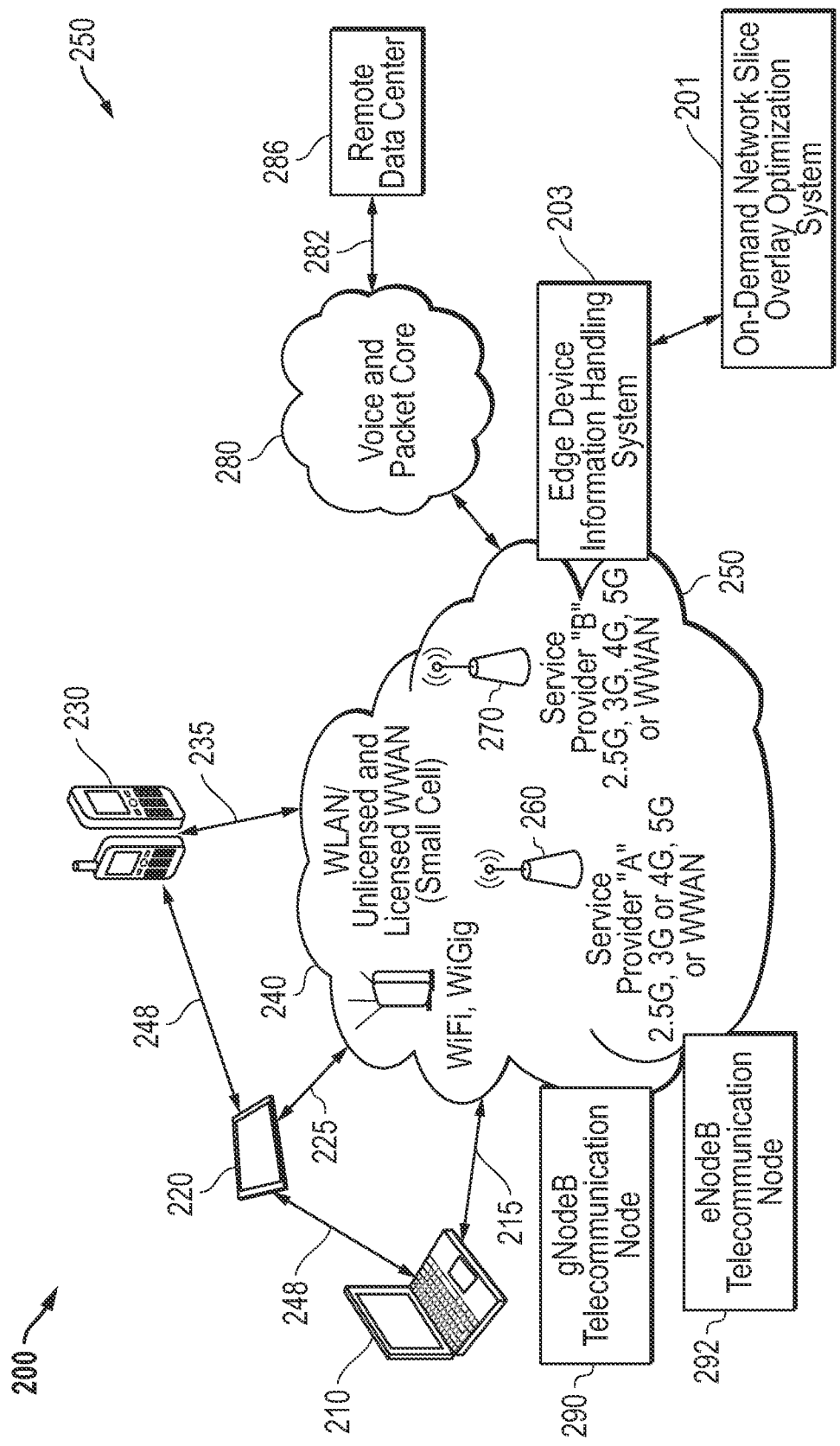
FIG. 2 is a block diagram of a network environment offering several communication protocol options and mobile information handling systems according to an embodiment of the present disclosure.

FIG. 2 illustrates a network 200 that can include one or more endpoint devices 210, 220, 230. The endpoint devices 210, 220, 230 shown in FIG. 2 may be similar to the endpoint devices 148-1, 148-2 described in connection with FIG. 1. In a particular embodiment, network 200 includes networked mobile endpoint devices 210, 220, 230, wireless network access points, and multiple wireless connection link options. A variety of additional computing resources of network 200 may include client mobile information handling systems, data processing servers, network storage devices, local and wide area networks, a RAN service provider, an on-demand network slice overlay optimization system 201 similar to that described in connection with FIG. 1, or other resources as needed or desired. As partially depicted, endpoint devices 210, 220, 230 may be a laptop computer, tablet computer, 360-degree convertible systems, wearable computing devices, or a smart phone device. These mobile endpoint devices 210, 220, 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option. As described herein, the endpoint devices 210, 220, 230 may be part of an organization such as a university, a department within a university, or other grouping of endpoint devices. In an embodiment, the endpoint devices 210, 220, 230 may be regionally located that access the network 240, 250 via a base station of a service providers 260 and 270 or an access point of a WLAN service provider.

Since WPAN or Wi-Fi Direct Connection 248 and WWAN networks can functionally operate similar to WLANs, they may be considered as wireless local area networks (WLANs) for purposes herein. In an embodiment, the endpoint devices 210, 220, 230 that form part of this WLAN may be considered and organization. Components of a WLAN may be connected by wireline or Ethernet connections to a wider external network such as a voice and packet core 280. For example, wireless network access points or base stations may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service providers 260 and 270. Again, as described herein, the organization of a number of endpoint devices 210, 220, 230 may be defined by the endpoint devices 210, 220, 230 accessing a specific or number of specific base stations. As described herein, the endpoint devices 210, 220, 230 may be operatively coupled to any of the macro-cellular connections 250 via one or more service providers 260 and 270 or to the wireless local area networks (WLANs) selectively. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the endpoint devices 210, 220, 230. In the example embodiment, mobile endpoint devices 210, 220, 230 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the endpoint devices 210, 220, 230 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile endpoint devices 210, 220, 230 may each have a plurality of wireless network interface systems or radio protocol subsystems capable of transmitting simultaneously within several communication bands or even utilizing a shared communication frequency band access multiple protocols. That communication within a shared communication frequency band may be sourced from different protocols on parallel wireless network interface systems or from a single wireless network interface system capable of transmitting and receiving from multiple protocols. Similarly, a single antenna or the plurality of antennas in each endpoint device 210, 220, 230 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on an endpoint device 210, 220, 230 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein. The antenna may cooperate with other antennas in a N×N MIMO (where "N" is any number) array configuration according to the embodiments described herein. Alternatively, embodiments may include a single transceiving antennas capable of receiving and transmitting, and/or more than one transceiving antennas. Each of the antennas included in the endpoint devices 210, 220, 230 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile endpoint devices 210, 220, 230 or similar connected to those additional wireless networks. Connection 282 between the wireless network 240 and remote data center 286 or connection to other additional wireless networks may be via Ethernet or another similar connection to the worldwide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile endpoint devices 210, 220, 230. Alternatively, mobile endpoint devices 210, 220, 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. In an embodiment, the remote data center 286 may include one or more servers executing instructions of the on-demand network slice overlay optimization system 201. In another embodiment, the on-demand network slice overlay optimization system 201 may be directly accessible by the endpoint devices 210, 220, 230 via the one or more networks. Having such remote capabilities may permit fewer resources to be maintained at the mobile endpoint devices 210, 220, 230 allowing streamlining and efficiency within those devices. Similarly, remote data center permits fewer resources to be maintained in other parts of network 200.

In an embodiment an edge device information handling system 203 may be operatively coupled to the wireless local network 240 and/or access a macro-cellular network 250. The edge device information handling system 203 may execute the on-demand network slice overlay optimization system 201 as described herein. In an embodiment, the edge device information handling system 203 may execute the on-demand network slice overlay optimization system 201 in order to manage the endpoint devices 210, 220, 230 as described herein in order to dynamically adjust network slices provided to the endpoint devices 210, 220, 230 and provide for any changes in the load demand based on a client business policy provided by the organization.

Although network connections 215, 225, and 235 are shown connecting wireless adapters of mobile endpoint devices 210, 220, 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile endpoint devices 210, 220, 230 may communicate intra-device via intra-device connections 248 when one or more of the mobile endpoint devices 210, 220, 230 are set to act as an access point or even potentially an WWAN connection via small cell communication on licensed or unlicensed WWAN connections. For example, one of the endpoint devices 210, 220, 230 may serve as a Wi-Fi hotspot in an embodiment. Concurrent wireless links to the endpoint devices 210, 220, 230 may be connected via any access points including other mobile information handling systems as illustrated in FIG. 2.

As described herein, the individual endpoint devices 210, 220, 230, being part of an organization such as a university or a department, may provide load profile metrics to an edge device information handling system 203 forming part of the network 240, 250. In an embodiment, the endpoint devices 210, 220, 230 may include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. The edge device information handling system 203 may accumulate these load profile metrics to the on-demand network slice overlay optimization system 201. The on-demand network slice overlay optimization system 201 is also operatively coupled to a RAN service provider that receives core metrics descriptive of the load capacity of a core network to provide data throughput at a given time. At this point the on-demand network slice overlay optimization system 201 may compare the load profile metrics to the core metrics to determine if the RAN service provider is currently provisioning the appropriate level of resources (e.g., network slices) to the organization. Where the load profile metrics indicate that the current network slices provisioned to the organization is not sufficient, the on-demand network slice overlay optimization system 201 may determine whether a client business policy defines a static client business policy or an elastic client business policy. Where an elastic client business policy exists, the on-demand network slice overlay optimization system 201 may direct a RAN service provider to allocate additional network slices to the organization using the network slice selection function. In this embodiment, the allocation of the network slices may be reflected in amendments made to an entitlement and amendments policy and provided to the client/organization. The client business policy is then updated with the entitlement and amendments policy and the client/organization is notified of these changes and potential additional costs associated with the increase of network slices allocated to the organization. In an embodiment, the elastic client business policy and dynamic provisioning of network slices includes a time frame set describing when the adjustments to the provisioning of network slices are made such that when the time frame expires, the changes in the load demand are adjusted to a default level based on the client business policy.

Where the client business policy is a static client business policy, any increase in network resource requirements from the organization may not be allowed due to a maximum of resources such as network slices being allocated to the organization. In this embodiment, the on-demand network slice overlay optimization system 201 may indicate the non-allocation of additional network slices to the organization indicating that the core metrics have additional resources available such as increased throughput and data channels but that these resources are not being allocated based on the static client business policy in effect. The client/organization may also be provided with information as to how to increase these resources in the future so that the endpoint devices 210, 220, 230 may be provided with consistent resource provisioning during an increase in load profile metrics. In an embodiment, the resource provisioning may include the assignment of additional network slices using, for example, the NSSF (e.g., 144, FIG. 1). The execution of the NSSF causes the edge device information handling system 203 executing the on-demand network slice overlay optimization system 201 to contact the service providers to provide and allocate additional network slices for the organization of endpoint devices 210, 220, 230. In an embodiment, the NSSF may further cause the service providers to provide additional telecommunication node resources to be accessed by the endpoint devices 210, 220, 230 of the organization. Example telecommunication node resources may include logical 5G radio nodes such as gNodeB telecommunication node 290 and 4G LTE radio nodes such as eNodeB telecommunication node 292. By provisioning the additional telecommunication node resources (e.g., gNodeB telecommunication node 290 and eNodeB telecommunication node 292) additional wireless links for 4G and 5G communications between the organization and its endpoint devices 210, 220, 230 and the edge device information handling system 203.

It is appreciated that the load profile metrics may include any indication from each of the endpoint devices 210, 220, 230 that additional data throughput is needed to provide for persistent connectivity with a network. These load profile metrics may include an indication of the type of application being executed on each of the endpoint devices 210, 220, 230 under the organization. For example, the execution of an email application may require relatively less data throughput and/or data channels than would, for example, an online gaming application. Although some applications such as online gaming applications may operate in connection with any cloud computing processes, the data transmission may include a significant amount of video/audio data transmitted between the individual endpoint devices 210, 220, 230 and a network server. In an embodiment, the load profile metrics may also indicate the number of endpoint devices 210, 220, 230 within the organization at any given time. In the embodiment, where an athletic event is scheduled and is underway, the number of endpoint devices 210, 220, 230 operatively and wirelessly coupled to the organizations wireless infrastructure may increase above what is a regular number of endpoint devices 210, 220, 230 in an area or a group. Again, this increase of endpoint devices 210, 220, 230 within the organization may require more resources and the load profile metrics may reflect this information as well.

FIG. 3 is a block diagram illustrating data transmissions between an on-demand network slice overlay optimization system 300 executing at one or more of an edge device 350-1, other edge devices 350-2, 350-3, 350-4, or remote server locations, and implements slice adjustments and wireless connectivity adjustments at a base station 350-1 or base stations 351-1, 351-2, 351-3, 351-4 and associated core networks for RANs for wireless connectivity for an organization's endpoint devices (for example a group of endpoint devices 348-1, 348-2, 348-3, 348-4, 348-5) according to an embodiment of the present disclosure. In an embodiment, the on-demand network slice overlay optimization system 300 is operatively coupled to and manages other edge devices 350-2, 350-3, 350-4 as well and other base stations 351-2, 351-3, 351-4 that may manage a plurality of other endpoint devices. The on-demand network slice overlay optimization system 300 may be included within a core commerce engine 342 that maintains a client business policy descriptive of either of a static client business policy or an elastic client business policy the organization is under. The on-demand network slice overlay optimization system 300 may access this client business policy in order to determine whether more or less network resources such as network slices are to be allocated to an organization based on received load profile metrics received by the respective edge device 350-1 as well as edge devices 350-2, 350-3, 350-4.

In the embodiment shown in FIG. 3, the organizations may be a physical arrangement of endpoint devices 348-1, 348-2, 348-3, 348-4, 348-5 grouped together in a location such as a college computer lab. Alternatively, an organization may be an association of a plurality of endpoint devices 348-1, 348-2, 348-3, 348-4, 348-5 that use a similar path to access a network such as a college or a university. In this example, a similar path may be one or more base stations 351-1 of a mobile wireless network. In either case, each of these endpoint devices 348-1, 348-2, 348-3, 348-4, 348-5 may be operatively coupled to a first edge device 350-1. It is appreciated that a plurality of other edge devices 350-2, 350-3, 350-4 may be operatively coupled to other groups or a group of other endpoint devices. It is this edge device 350-1 that may accumulate and transmit the load profile metrics from each of the group of endpoint devices 348-1, 348-2, 348-3, 348-4, 348-5 to the on-demand network slice overlay optimization system 300. In an embodiment, the edge devices 350-1, 350-2, 350-3, 350-4 may form part of a wider on-demand network slice overlay optimization system 300.

During operation, the first edge device 350-1 may monitor, in real-time, the load profile metrics at each organization that services one or more endpoint devices 348-1, 348-2, 348-3, 348-4, 348-5. Additionally, a plurality of edge devices 350-2, 350-3, 350-4 may, in real-time, monitor profile metrics at each organization that services other groups or a group of other endpoint devices. In the example presented herein with the athletic event occurring at a university, the first edge device 350-1 may monitor if and when network resource demands (e.g., detailed in load profile metrics) for the number of endpoint devices 348-1, 348-2, 348-3, 348-4, 348-5 increases and what data load requirements are necessary to maintain a persistent connectivity status at the organization. Further, where an increase in demand for network resources, per the load profile metrics received by a plurality of edge devices 350-2, 350-3, 350-4 (e.g., operatively coupled to the on-demand network slice overlay optimization system 300 via a plurality of base stations), is detected, those resources may be apportioned to provide increased connectivity bandwidth depending on the business policy and entitlements and amendments, as well as elasticity of the same, for the organizations or groups (e.g., a geographic location covered by a plurality of base stations) to maintain various levels of persistent connectivity status. Because endpoint load profile metrics includes both data related to the applications being executed on the individual endpoint devices 348-1, 348-2, 348-3, 348-4, 348-5 as well as the number of endpoint devices 348-1, 348-2, 348-3, 348-4, 348-5 requesting wireless services within the organization, these endpoint load profile metrics may fluctuate significantly even where a pre-scheduled event such as an athletic event is anticipated. Thus, a static level of wireless services may not be enough to accommodate for an event where wireless network resources spike.

When the wireless network load profile metrics are received by the on-demand network slice overlay optimization system 300 from the edge devices 350-1, 350-2, 350-3, 350-4 and endpoint load profile metrics from endpoint devices associated with the organizations are received, the on-demand network slice overlay optimization system 300 may associate those wireless network load profile metrics and endpoint device load profile metrics with the organization and one or more groups of endpoint devices 348-1, 348-2, 348-3, 348-4, 348-5 for each of the first edge device 350-1 and/or plurality of edge devices 350-2, 350-3, 350-4. In an embodiment, the on-demand network slice overlay optimization system 300 may then execute the core commerce engine (e.g., commerce engine 142, FIG. 1) to access a client business policy associated with the organization. The on-demand network slice overlay optimization system 300 may receive real-time core metrics from a RAN service provider or enterprise managed mobile networks descriptive of the load capacity of a core network to provide data throughput at a given time. With this information, the on-demand network slice overlay optimization system 300 may determine whether the real-time data load demand from the endpoint load profile metrics and in view of the wireless network load profile metrics from the edge device can be provisioned by the load capacity described in the core metrics. In an embodiment, additional network slices may be allocated to a specific organization based on an increase in load profile metrics. In an embodiment, fewer network slices may be allocated to a specific organization based on a decrease in load profile metrics. Additionally, the on-demand network slice overlay optimization system 300 can also allocate additional telecommunication node resources to be accessed by the endpoint devices 348-1, 348-2, 348-3, 348-4, 348-5 of each of the organizations formed. Example telecommunication node resources may include logical 5G radio nodes such as gNodeB telecommunication node and an eNodeB telecommunication node. By provisioning the additional telecommunication node resources, additional wireless links for 4G and 5G communications between the organization and its endpoint devices 348-1, 348-2, 348-3, 348-4, 348-5 and the edge device information handling systems may also provide elastic data bandwidth levels and additional or fewer slices by virtue of the execution of the on-demand network slice overlay optimization system 300.

Where the real-time data load demand can be provisioned by the load capacity described in the core metrics, the on-demand network slice overlay optimization system 300 may then determine whether there is a match of the core metrics to meet the wireless network load profile metrics reported by the regional edge devices 350-1, 350-2, 350-3, 350-4 and the real time load of the endpoint load profile metrics reported by the group of managed endpoint devices 348-1, 348-2, 348-3, 348-4, 348-5 and with reference toa client business policy 352 associated with the organization. In this embodiment, the client business policy 352 may indicate whether the organization (e.g., the university) has a static client business policy 352 or an elastic client business policy 352 as described herein. Where the increase or decrease in load profile metrics can be met by the core metrics at the RAN service provider, the on-demand network slice overlay optimization system 300 may direct the RAN service provider to increase or decrease the network slices allocated to the organization. Additionally, the on-demand network slice overlay optimization system 300 may amend the entitlements 354 associated with the organization's client business policy 352 and notify the client/organization of the changes to the client business policy. As described herein, the changes to the client business policy and allocation of additional wireless network resources may be temporary under an elastic client business policy. In an embodiment, these changes to the client business policy may include changes to an amount charged to the organization due to the additional allocation of wireless network resources. In an embodiment the client business policy may include a budget limit that limits the costs associated with the allocation of resources and, accordingly, the allocation of those resources if the costs exceed that budget. This process may continue as the load profile metrics change again.

Figure 4:
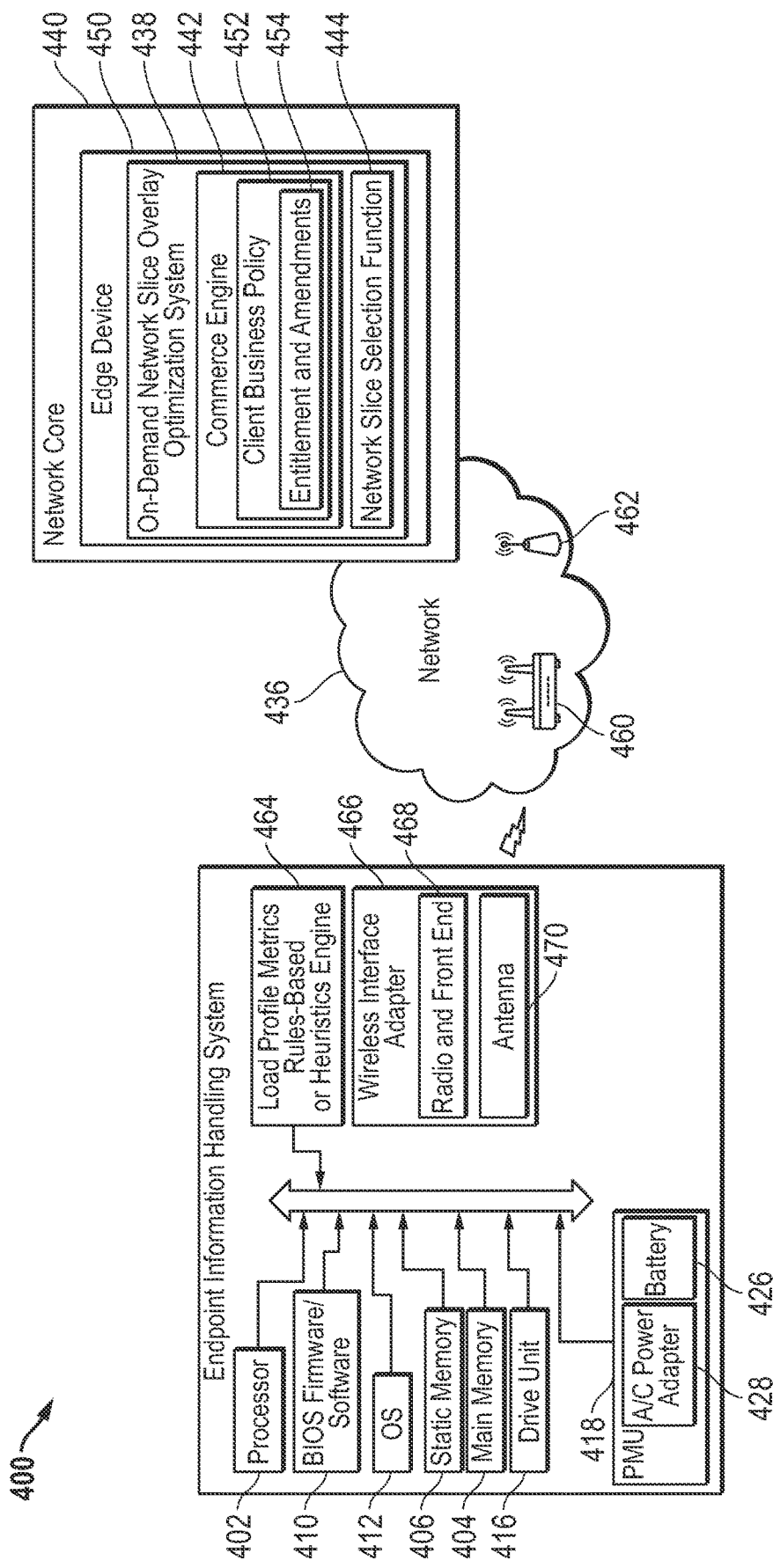
FIG. 4 is a block diagram illustrating a network slicing optimization system according to another embodiment of the present disclosure.

FIG. 4 is a block diagram illustrating a mobile network 400 with an on-demand network slice overlay optimization system 438 and an endpoint information handling system according to another embodiment of the present disclosure. FIG. 4 shows an endpoint information handling system 448 operatively and wirelessly coupled to a network core 440 via a network 436 and edge device 450. Although a single endpoint information handling system 448 is operatively coupled to the network core 440, the present specification contemplates that a plurality of endpoint information handling systems 448 may be operatively coupled to the network core 440 and may form an organization or group of endpoint information handling systems 448. Again, in the embodiments described herein, these endpoint information handling systems 448 may be grouped together by a region, an organization, or a subgroup of any organization that defines specific end-point device groupings. By way of example, a college or university may be an organization that is part of a regional grouping of endpoint devices. The college or university may also break a number of endpoint devices by organization or departments such as an athletic organization within the college or university or a physics department at that university or college.

FIG. 4 shows that each of the endpoint information handling systems 448 may include a processor 402 such as a central processing unit (CPU), control logic or some combination of the same. Any of the processing resources may operate to execute code that is either firmware or software code. Moreover, the endpoint information handling systems 448 can include memory such as a main memory, static memory, computer readable medium storing instructions of a load profile metrics rules-based or heuristics engine 464, and drive unit 116 (volatile (e.g., random-access memory, etc.), nonvolatile (read-only memory, flash memory etc.) or any combination thereof).

The individual endpoint information handling systems 448 includes one or more of an operating system (OS) 412, and basic input/output system (BIOS) firmware/software 410 or application programs that may be executable instructions executed at any processor 402 and stored at one or more memory devices. BIOS firmware/software 410 functions to initialize endpoint information handling systems 448 on power up, to launch an OS 412, and to manage input and output interactions between the OS 412 and the other elements of endpoint information handling system 448. In a particular embodiment, BIOS firmware/software 410 resides in memory, and include machine-executable code that is executed by processor 402 to perform various functions of the endpoint information handling system 448 as described herein. In another embodiment, application programs and BIOS firmware/software 410 reside in another storage medium of endpoint information handling system 448. For example, application programs and BIOS firmware/software 410 can reside in drive, in a ROM (not illustrated) associated with the endpoint information handling systems 448, in an option-ROM (not illustrated) associated with various devices of endpoint information handling systems 448, in a storage system (not illustrated) associated with network channel of a wireless interface adapter 466, in another storage medium of the endpoint information handling systems 448, or a combination thereof. Executable code instructions for application programs and BIOS firmware/software 410 can each be implemented as single programs, or as separate programs carrying out the various features as described herein.

Wireless interface adapter 466 represents a network interface card (NIC) disposed within the endpoint information handling system 448, on a main circuit board of the endpoint information handling system 448, integrated onto another component such as processor 402, in another suitable location, or a combination thereof. The wireless interface adapter 466 can include another information handling system, a data storage system, another network, a grid management system, another suitable resource, or a combination thereof. Wireless interface adapter 466 in an embodiment may operably connect to a network 436. Connection to network 436 may be wired or wireless.

The wireless interface adapter 466 can provide connectivity to a network 436, such as a wide area network (WAN), a local area network (LAN), wireless local area network (WLAN), a wireless personal area network (WPAN), a wireless wide area network (WWAN), or other network. Connectivity may be via wired or wireless connection. Wireless interface adapter 466 may include an adaptive massive MIMO Multiplexer with transmitter/receiver circuitry, wireless controller circuitry, amplifiers and other circuitry for wireless communications. The wireless interface adapter 466 may also include antennas 470 operatively coupled to a radio and front end 468 which may be tunable antenna systems for use with the system and methods disclosed in the embodiments herein. The antenna controller 466 may also include wireless controllers to manage authentication, connectivity, communications, power levels for transmission, buffering, error correction, baseband processing, and other functions of the wireless interface adapter 466.

The endpoint information handling system 448, similar to the information handling system 100 of FIG. 1, may include a processor 402 such as a central processing unit (CPU), control logic or some combination of the same. Any of the processing resources may operate to execute code that is either firmware or software code. Moreover, the endpoint information handling system 448 can include memory such as main memory 404, static memory 406, computer readable medium storing instructions of, for example, the load profile metrics rules-based or heuristics engine 464, and drive unit 416 (volatile (e.g., random-access memory, etc.), nonvolatile (read-only memory, flash memory etc.) or any combination thereof).

The endpoint information handling system 448 may further include a PMU 418 (a.k.a. a power supply unit (PSU)). The PMU 418 may manage the power provided to the components of the endpoint information handling system 448 as the processor 402, a cooling system, one or more drive units 416, a graphical processing unit (GPU), a video/graphic display device or other input/output devices, and other components that may require power when a power button has been actuated by a user. In an embodiment, the PMU 418 may monitor power levels and be electrically coupled to the endpoint information handling system 448 to provide this power and coupled to bus 408 to provide or receive data or instructions. The PMU 418 may regulate power from a power source such as a battery 426 or A/C power adapter 428. In an embodiment, the battery 426 may be charged via the A/C power adapter 428 and provide power to the components of the endpoint information handling system 448 when A/C power from the A/C power adapter 428 is removed.

The load profile metrics rules-based or heuristics engine 464 in each of the endpoint information handling systems 448 may be a heuristics engine utilizing any type of artificial neural network, Bayesian network, decision trees, regression analysis, among other machine learning service algorithms that has been trained to model load profile metrics of each individual endpoint information handling system 448. In an embodiment, the load profile metrics rules-based or heuristics engine 464 applies a machine learning methodology to determine correlations of the influencing factors including operating software applications on the endpoint information handling system 448 and other metrics associated with the operation of the endpoint information handling systems 448 across the network 436. Thus the endpoint information handling system may determine what endpoint load profile metrics relating to operating applications to report as real-time load demand in endpoint load profile metrics to the on-demand network slice overlay optimization system 438 at an edge device 450 in network core 440. In other embodiments, the load profile metrics rules-based or heuristics engine 464 may include a table that includes a list of triggers determine what endpoint load profile metrics relating to operating applications to report as real-time load demand in endpoint load profile metrics to the on-demand network slice overlay optimization system 438. Such endpoint load profile metrics and core metrics may then be cross-referenced at the on-demand network slice overlay optimization system 438 to generate instructions to dynamically adjust network slices at the regional edge device 450 or elsewhere in the core 440 or at a basestation or access point 460 or 462 to provide for any changes in the load demand based on a client business policy provided by the regional edge device. In an embodiment, the load profile metrics from each of the endpoint information handling systems 448 executing this load profile metrics rules-based or heuristics engine 464 may be provided to the edge device 450. In an embodiment, the load profile metrics rules-based or heuristics engine 464 is executed on a processor 402. Additionally, or alternatively, the load profile metrics rules-based or heuristics engine 464 is executed remotely in whole or in part on an information handling system management system such as Dell Optimizer® which may manage the plurality of the endpoint devices such as 448 for an organization. The endpoint load profile metrics associated with each of the endpoint information handling systems 448 may be provided remotely to the on-demand network slice overlay optimization system 438 at the network core 440440 or edge device 450 in or operatively coupled to network core 440 or at a remote location in the cloud via an out-of-band (OOB) communication or other communication link. In an embodiment, the load profile metrics rules-based or heuristics engine 464 may be trained at a remote location and a trained machine learning model may be executed locally at the endpoint information handling systems 448 described herein.

FIG. 4 also shows that the on-demand network slice overlay optimization system 438 may form part of the network core 440. As described herein, the network core 440 may provide the core metrics used by the on-demand network slice overlay optimization system 438 to determine if and when additional or fewer network slices should be allocated for the use of an organization to use. This organization may include the endpoint information handling system 448 among a number of other endpoint information handling systems that are grouped into the organization. In an embodiment, the core metrics include data descriptive of the current load capacity at the core network, available infrastructure (e.g., base stations) that may be used to provide additional data throughput to an organization, number of unique requests for authenticating endpoint information handling systems 448 for service, number of service invocations processing, network congestion, protocols within a geographical area, switchable capacity among core resources, as well as other CORE and RAN metrics. These core metrics may be provided to the on-demand network slice overlay optimization system 438. In an embodiment, the network core 440 may include servers to operate the on-demand network slice overlay optimization system 438 or may utilize operatively coupled servers such as edge device 450. In an embodiment, the edge device 450 may be separate from the network core 440 and may communicate with the network core 440 to receive the core metrics. In another embodiment, the network core 440, an edge device 450, or a remotely located information handling system in the cloud may execute distributed portions of computer software code associated with the on-demand network slice overlay optimization system 438.

The edge device 450 associated with the on-demand network slice overlay optimization system 438 may also facilitate the execution of a commerce engine 442. The commerce engine 442 may reside on the network core 440 or may be distributed across the cloud network 436 and may be software that determines whether the real-time data load demand at the endpoint information handling system 448 can be provisioned by the load capacity described in the core metrics received at the network core 440. These core metrics may be received from a RAN service provider of the network core 440 descriptive of, at least, the load capacity of the network core 440 to provide data throughput at a given time. In an embodiment the network core 440 may be part of a computer network that interconnects the on-demand network slice overlay optimization system 438 with a third-party service RAN provider such as a cellular network provider and/or an internet service provider. These third-party RAN service providers may provide up-to-date data related to the network infrastructure and available load capacity on the RAN network 136. The edge device 450 may be any information handling system that is capable of executing the on-demand network slice overlay optimization system 438 and may receive the core metrics from the network core 440 as input for the on-demand network slice overlay optimization system 438. The edge device 450 also provides the output from the on-demand network slice overlay optimization system 438 to one or more RANs associated with the network core 440 that describes instructions to dynamically adjust network slices at the regional edge device to provide for any changes in the load demand based on a client business policy provided by the regional edge device.

In an embodiment the client business policy 452 may define the services to be provided to the organization that the endpoint information handling system 448 is part of and may include agreements between the organization and the RAN provider. In an embodiment, the client business policy 452 may define whether the client business policy between the organization and the RAN provider is a static client business policy or an elastic client business policy. A static client business policy would include a description that the organization is to be provided a static level of data throughput and data channels provided thereto. In this example, the static level may set a maximum and minimum level of resources provided to the organization that defines a maximum and minimum level of data throughput and data channels provided to the organization. In this embodiment, the organization may notify the on-demand network slice overlay optimization system 438 of an increase in a need for data throughput and data channels in real time. In an embodiment, this increase may exceed the maximum level of data throughput and data channels as defined in the client business policy 452. Where this occurs, the on-demand network slice overlay optimization system 438 may review the client business policy 452 and compare the client business policy with the available core metrics and resources available at the RAN to determine whether additional resources (e.g., network slices) are available for use by the organization. Where there are not more network slices available, the on-demand network slice overlay optimization system 438 may send a notice to the organization that the load profile metrics cannot be met, but that there is additional available data throughput and data channels at the RAN. The client may then later change the terms of the client business policy 452, but at this time the on-demand network slice overlay optimization system 438 does not instruct a network slice selection function 444 to increase the network slices or invoke additional new broadband resources such as through the operative wireless coupling of additional base stations or access points (e.g., 460 or 462 as examples but any number are contemplated) allocated to and on behalf of the organization.

In another embodiment, the client business policy 452 may define a client business policy between the organization and the RAN provider that is an elastic client business policy 452. In this embodiment, an elastic client business policy 452 may define a base level of data throughput and data channels provided to the organization but with an option to increase the data throughput and data channels provided to the organization by the assignment of more network slices to the organization at the RAN service provider and invoke additional new broadband resources such as through the operative wireless coupling of additional base stations or access points allocated to and on behalf of the organization. In the context of the example presented herein with the athletic department, as the athletic event occurs, the number of endpoint information handling systems 448 may increase with new or original endpoint information handling systems 448 being added to the group of endpoint information handling systems 448 under the organization. Again, the increased number of endpoint information handling systems 448 may require more data throughput and data channels provided by the RAN service provider based on the increase in resources at the organization and presented to the on-demand network slice overlay optimization system 438 by the edge device 450. Again, the elastic client business policy 452 may allow for the additional increase in network slices and invoke additional new broadband resources such as through the operative wireless coupling of additional base stations or access points and the network slice selection function 444 may send a request to the RAN service provider to increase the network slices based on the confirmation that the client business policy 452 allows for it and the network core 440 has capacity to provide those additional resources. The client business policy 452 may allow for the increase in network slices and wireless broadband resources of 5G or other protocols allocated to the organization and may also include a cost associated with the allocation of those network slices and additional new broadband resources such as through the operative wireless coupling of additional base stations or access points to the organization. Thus, the costs associated with providing the endpoint information handling systems 448 with wireless services may be maintained at a certain level and only increased when necessary to increase the network slices allocated for the organization in an embodiment.

If and when the number of endpoint information handling systems 448 decreases, the same process may be initiated where the on-demand network slice overlay optimization system 438 receives load profile metrics from the endpoint information handling systems 448 at the organization that indicates that the number of network slices and additional new broadband resources such as through the operative wireless coupling of additional base stations or access points allocated to the organization can be decreased. Again, the client business policy 452 is reviewed by the on-demand network slice overlay optimization system 438 and, based on the load profile metrics, in real-time, reduce the network resources to the organization. Such a reduction of resources allows the costs associated with the operation of the organization to be reduced due to the reduction in resources consumed by the organization at the RAN service provider.

Figure 5:
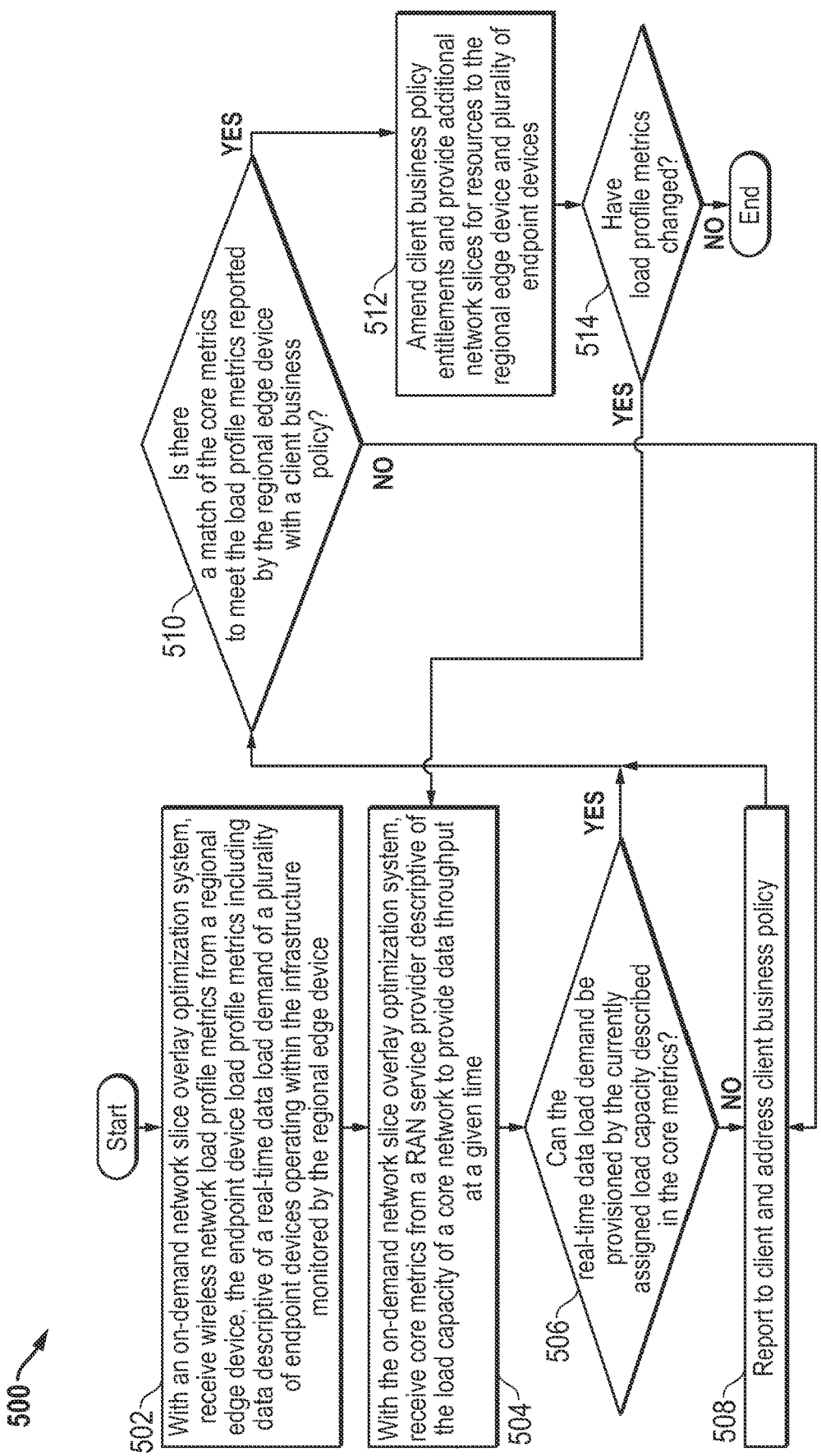
FIG. 5 is a flow diagram illustrating a method implemented at a network slicing optimization system according to an embodiment of the present disclosure.

FIG. 5 is a flow diagram illustrating a method 500 of operating an on-demand network slice overlay optimization system according to an embodiment of the present disclosure. The method 500 may be executed on an on-demand network slice overlay optimization system that may be on a core network such as executing on an edge device and working with an information handling system management system such as Dell Optimizer®. The on-demand network slice overlay optimization system may be provided with various sets of metrics as input. These sets of metrics may include wireless network load profile metrics from an edge device, endpoint load profile metrics from the endpoint devices both reported to, for example, an information handling system management system such as Dell Optimizer® used to manage plural endpoint information handling system devices for an organization. Further, the on-demand network slice overlay optimization system may receive core metrics from a network core such as a 4G or 5G core or other wireless network base stations.

In an embodiment, the method 500 may include, at block 502, receiving wireless network load profile metrics from a regional edge device, the load profile metrics including data descriptive of a real-time data load demand of a plurality of endpoint devices operating within the infrastructure load monitored by a regional edge device. These load profile metrics may be used as input with an on-demand network slice overlay optimization system that, in an embodiment, is operated at the core network such as executing on an edge device and working with an information handling system management system such as Dell Optimizer®. Because the data load represented in the wireless network load profile metrics may change or fluctuate, the on-demand network overlay optimization system may use this data, in part, to determine the network slices to provide to the organization for one or more groups of endpoint information handling systems at any given time.

As described herein, the organization may be any organization that manages and services any number of endpoint devices and may include a geographic or location region that a base station or number of base stations of a wireless mobile cellular network service. In an embodiment, the endpoint load profile metrics includes data related to the applications being executed on each of the endpoint devices 148-1, 148-2 as well. In this example embodiment, the type of applications being executed by each of the endpoint devices may be used to determine the data load and data channels necessary to service all of the endpoint device or devices. In an embodiment, the endpoint load profile metrics is harvested by an information handling system management system such as Dell Optimizer® via an in-band communication between the endpoint devices and the information handling system management system. In an embodiment, the endpoint load profile metrics is harvested by an information handling system management system such as Dell Optimizer® via an OOB communication as described herein. Continuing with the example where the organization is an athletic department of a university, the endpoint devices may be executing one or more of a differing type of applications including email applications, video streaming applications, video conferencing applications, gaming applications, among others. Because each of these different types of applications being executed on the endpoint devices may require different data throughput, this data may form part of endpoint load profile metrics sent by each of the endpoint devices to be received by the information handling system management system such as Dell Optimizer® and the on-demand network overlay optimization system.

The method 500 may also include, at block 504, receiving core metrics from a RAN service provider descriptive of the load currently-assigned capacity of a core network to provide data throughput at a given time to any endpoint information handling system groups in an organization. These core metrics may be received from a RAN service provider at, in an example embodiment, a telecommunication business unit (TBU) of the core network descriptive of the load capacity of a core network to provide data throughput at a given time. The core network may be used to interconnect one or more RANs providing a path for exchange of information between the RANs and endpoint information handling system. In an embodiment of the present disclosure, the core network may also include a computer network that interconnects the on-demand network overlay optimization system with a third-party service RAN provider such as a cellular network provider and/or an internet service provider. These third-party RAN service providers may provide up-to-date core metrics data related to the network infrastructure and available load capacity on the RAN network (e.g., gNodeB, eNodeB, etc.). In an embodiment, these third-party RAN service providers may be contracted to provide this information to the telecommunications business unit and the information handling system management system such as Dell Optimizer® in managing the endpoint devices as described herein.

The method 500 may continue with determining, at block 506, where the load capacity described in the core metrics can be provisioned to meet the real-time data load demand. This determination is completed by the on-demand network slice overlay optimization system by comparing the current, real-time load profile metrics including network load profile metrics from an edge device and load profile metrics from the endpoint devices via, for example, an information handling system management system such as Dell Optimizer® with the core metrics to determine whether the available resources at the RAN service provider can accommodate for an increase in network resource requirements from the organization and its associated endpoint devices. In the embodiment where the RAN service provider cannot provide for the increase in network resource requirements from the organization based on the load profile metrics, the method 500 may continue at block 508 with reporting this to the client/organization and address the business policy established for the organization or a particular group of endpoints in the organization. By addressing the client business policy, the on-demand network slice overlay optimization system may confirm whether the business policy is a static client business policy or an elastic client business policy. A static client business policy would include a description that the organization is to be provided a static level of data throughput and data channels provided thereto. In this example, the static level may set a maximum and minimum level of resources provided to the organization that defines a maximum and minimum level of data throughput and data channels currently assigned or provided to the organization.

Where the demand is not met in this embodiment, the organization may notify the on-demand network slice overlay optimization system of an increase in a need for data throughput and data channels in real time. In an embodiment, this increase may exceed the maximum currently-assigned level of data throughput and data channels as defined in the client business policy. Where this occurs, the on-demand network slice overlay optimization system may review the client business policy and compare the client business policy with the available core metrics received from the RAN and core and indicating resources available at the RAN to determine whether additional resources (e.g., network slices) are available for use by the organization. The on-demand network slice overlay optimization system may then send a notice to the organization that the load profile metrics cannot be met under currently assigned level in the static business policy but that there are additionally available slices for expanded data throughput and data channels at the RAN. The client may then later change the terms of the static client business policy, but at this time the on-demand network slice overlay optimization system does not instruct a network slice selection function to increase the network slices allocated to and on behalf of the organization.

In another embodiment, the client business policy may define an agreement between the organization and the RAN provider that is an elastic client business policy. In this embodiment, an elastic client business policy may define a base level of data throughput and data channels provided to the organization, but with an option to increase the data throughput and data channels provided to the organization by the assignment of more network slices to the organization at the RAN service provider. In the context of the example presented herein with the athletic department, as the athletic event occurs, the number of endpoint devices may increase with new or original endpoint devices being added to the group of endpoint devices under the organization. Again, the increased number of endpoint devices may require more data throughput and data channels provided by the RAN service provider based on the increase in resources at the organization and presented to the on-demand network slice overlay optimization system by the edge device. Again, the elastic client business policy may allow for the additional increase in network slices and the network slice selection function may send a request to the RAN service provider to increase the network slices based on the confirmation that the client business policy allows for it and the core network has capacity to provide those additional resources. As described herein, the NSSF 144 may select a network slice instance defining specific versions or replicas of each network function to be used in order to process data packets transceived with one or more endpoint devices 148-1, 148-2 of an organization and are assigned to a specifically identified network slice, in an embodiment. The on-demand network slice overlay optimization system may thus, add (or subtract) additional 5G capacity and baseband wireless links or portions thereof in some embodiments. In other embodiments, the on-demand network slice overlay optimization system can even ensure instructions to the enterprise mobile network or service provider to add wireless links for slices in other additional wireless protocols under an elastic client business policy if presented and activated. In an embodiment, execution of the NSSF by the core network causes the edge device information handling system executing the on-demand network slice overlay optimization system to contact the service providers to provide and allocate additional network slices for the organization of endpoint devices in the organization. In an embodiment, the NSSF may further cause the service providers to provide additional telecommunication node resources to be accessed by the endpoint devices of the organization. Example telecommunication node resources may include logical 5G radio nodes such as gNodeB telecommunication node and eNodeB telecommunication node. By provisioning the additional telecommunication node resources (e.g., gNodeB telecommunication node and eNodeB telecommunication node) additional wireless links for 4G and 5G communications between the organization and its endpoint devices and the edge device information handling system. The client business policy may allow for the increase in network slices allocated to the organization and may also include a cost associated with the allocation of those network slices to the organization. Thus, the costs associated with providing the endpoint devices with wireless services may be maintained at a certain level and only increased when necessary to increase the network slices allocated for the organization in an embodiment. In an embodiment, the commerce engine and information handling system management system such as Dell Optimizer® may monitor for a need to increase or decrease the network slices for any given organization.

Where the comparison between the load profile metrics and core metrics indicates that the RAN service provider can increase the network slices allocated to the organization, the method 500 may continue with determining whether the core metrics meeting the load profile metrics reported by the regional edge device matches with the client business policy, at block 510. Again, this determination may be based on whether the client business policy is a static client business policy or an elastic business policy. Where client business policy is a static client business policy, the increase in network slices and other network resources allocated to the organization may not be allowed. In this example this may be reported to the client/organization and the client may be notified that whether or not there are additional network resources available for use by the organization, the static client business policy is preventing the allocation of those resources.

Where the client business policy is an elastic client business policy, the method may continue at block 512 with amending the client business policy entitlements and provide additional network slices for resources to the regional edge device and plurality of endpoint devices as described herein. In an embodiment, the client may also be notified of the amendments made to the client business policy and any additional costs associated with the provisioning of network resources may be relayed to the client. Additionally, the entitlement and amendments may be updated accordingly as described in connection with FIG. 1.

The allocation of resources (e.g., network slices) to the organization may continue until, at block 514 the on-demand network slice overlay optimization system determines that the load profile metrics have changed. Where the load metrics indicates that the additional network slices allocated to the organization are not necessary based on a number of endpoint devices not being associated with the organization or the applications being executed by the endpoint devices not requiring additional resources, the method may continue at block 504 with again comparing the load profile metrics to the core metrics and adjusting the network slice allocated to the organization and its edge devices. Where no change has been detected, the process may end and maintain the allocated resources. In an embodiment, the on-demand network slice overlay optimization system may continuously monitor for any changes to either of the load profile metrics and available core metrics to determine if and when to allocate more or less network resources (e.g., network slices) to the organization. This method 500 provides for an endpoint-to-core, real-time visibility and telemetry access tied to a commerce engine of the on-demand network slice overlay optimization system. This may both increase the persistent connectivity capabilities of the organization and managed endpoints (e.g., via an information handling system management system such as Dell Optimizer® located within the device (e.g., laptop) or on one or more information handling systems distributed within the network), while also reducing the costs associated with the provisioning of the network resources for the organization on demand. The methods and systems described herein may prevent the allocation of network resources unnecessarily where the number of edge devices and the associated load profile metrics indicate that additional network resources are not necessary to maintain persistent connectivity for the endpoint devices.

The blocks of the flow diagrams of FIG. 5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An edge information handling system executing an on-demand network slice overlay optimization system comprising:
   a processor;
   a memory;
   a power management unit (PMU);
   the processor executing code instructions of the on-demand network slice overlay optimization system configured to:
      receive wireless network load profile metrics from an enterprise organization operating a grouped plurality of enterprise endpoint devices that are managed via the edge information handling system and the endpoint load profile metrics including data descriptive of a real-time data load demand from the grouped plurality of enterprise endpoint devices operating with enterprise infrastructure monitored by the edge information handling system;
      receive core metrics from a radio access network (RAN) service provider descriptive of the load capacity of a core network of a RAN to provide data throughput at a given time;
      determine whether the real-time data load demand of the grouped plurality of enterprise endpoint devices can be provisioned to the load capacity described in the core metrics; and
      provide instructions to dynamically adjust network slices in an enterprise-assigned load capacity having a plurality of network slices for the enterprise organization through a wireless connection with a wireless base station or a wireless access point of a network service provider, where dynamic adjustment of network slices in the enterprise-assigned load capacity is controlled and defined at the edge information handling system for the enterprise to provide for addition or subtraction of network slices for any changes in the real-time data load demand based on an elastic client business policy enforced at the edge information handling system for wireless connectivity of the grouped plurality of enterprise endpoint devices.

2. The information handling system of claim 1 further comprising:
   the processor to access a commerce engine and stored client business policy, the client business policy including:
      a description of the contractual static data bandwidth to be provided to the enterprise organization as the capacity the enterprise organization has through the wireless connection with the wireless base station or the wireless access point; and
      a description of an elasticity of access to the load capacity of the core network that the grouped plurality of enterprise endpoint devices may access as managed by the edge information handling system to which the data throughput may be expanded or contracted based on real-time data load demand.

3. The information handling system of claim 1, wherein the client business policy is referred to by the on-demand network slice overlay optimization system to determine whether data throughput may be increased by increasing the network slices attributed to the grouped plurality of enterprise endpoint devices managed by the edge information handling system; and
   wherein the network slices attributed to the grouped plurality of enterprise endpoint devices managed by the edge information handling system are to be increased or decreased, providing a notification to the enterprise organization associated with the client business policy.

4. The network slicing optimization system of claim 2, wherein the client business policy is referred to by the on-demand network slice overlay optimization system to determine whether data throughput may be decreased by decreasing the network slices attributed to the grouped plurality of enterprise endpoint devices managed by the edge information handling system, and wherein the network slices attributed to the grouped plurality of enterprise endpoint devices by the edge information handling system are to be decreased, providing a notification to the enterprise organization associated with the client business policy.

5. The information handling system of claim 1 further comprising:
the real-time data load demand received from the grouped plurality of enterprise endpoint devices including data descriptive of the applications being executed on the grouped plurality of enterprise endpoint devices.

6. The information handling system of claim 1 further comprising:
the processor accessing a commerce engine to determine a maximum limit and a minimum limit of network slices to be provided to the grouped plurality of enterprise endpoint devices managed by the edge information handling system based on the client business policy.

7. The information handling system of claim 1, wherein the instructions to dynamically adjust network slices for the grouped plurality of enterprise endpoint devices at the edge information handling system includes setting a time frame when the adjustments to the provisioning of network slices are made such that when the time frame expires, the dynamically adjusted network slices set to accommodate the load demand for the grouped plurality of enterprise endpoint devices is adjusted to a default level based on the client business policy.

8. The information handling system of claim 1 further comprising:
the instructions to dynamically adjust network slices for the grouped plurality of enterprise endpoint devices determined at the edge information handling system are sent to a network slice selection function (NSSF) in core network to adjust network slice allocation to the grouped plurality of enterprise endpoint devices.

9. A computer implemented method to execute:
an on-demand network slice overlay optimization system, comprising:
receiving wireless network load profile metrics from a grouped plurality of enterprise endpoint devices managed by an edge information handling system;
receiving endpoint device load profile metrics including data descriptive of a real-time data load demand of the grouped plurality of enterprise endpoint devices operating within a portion of enterprise infrastructure monitored and managed by the edge information handling system for an enterprise organization;
receiving core metrics from a radio access network (RAN) service provider descriptive of the load capacity of a core network to provide data throughput at a given time;
determining, via a processor executing code instructions of the on-demand network slice overlay optimization system, whether the load capacity described in the core metrics can be provisioned to accommodate the real-time data load demand of the grouped plurality of enterprise endpoint devices managed by the edge information handling system; and
dynamically adjusting network slices from an enterprise-assigned load capacity of a plurality of network slices for the enterprise organization through a wireless connection with at least one wireless base station or at least one wireless access point of a network service provider, where dynamic adjustment of network slices in the enterprise-assigned load capacity is controlled, assigned and managed by the edge information handling system for the enterprise and the grouped plurality of enterprise endpoint devices to provide for addition or subtraction of network slices for any changes in the load demand based on a client business policy provided at the edge information handling system and the real-time data load demand.

10. The method of claim 9 further comprising:
with a commerce engine, storing the client business policy, the client business policy including:
a description of the contractual static data bandwidth to be provided to the organization to determine the capacity the enterprise organization has through the at least one wireless connection; and
a description of an elasticity of access to the load capacity of the core network that manages the grouped plurality of enterprise endpoint devices to which the data throughput may be expanded or contracted based on real-time data load demand.

11. The method of claim 10, wherein the client business policy is referred to by the on-demand network slice overlay optimization system to determine whether data throughput may be increased by increasing the network slices attributed to the grouped plurality of enterprise endpoint devices managed by the edge information handling system, and wherein the network slices attributed to the grouped plurality of enterprise endpoint devices managed by the edge information handling system are to be increased or decreased, providing a notification to the enterprise organization associated with the client business policy.

12. The method of claim 10, wherein the client business policy is referred to by the on-demand network slice overlay optimization system to determine whether data throughput may be decreased by decreasing the network slices attributed to the grouped plurality of enterprise endpoint devices managed by the edge information handling system and wherein the network slices attributed to the grouped plurality of enterprise endpoint devices managed by the edge information handling system are to be decreased, providing a notification to the enterprise organization associated with the client business policy.

13. The method of claim 9 further comprising:
receiving, via an out-of-band (OOB) link to an endpoint device management application, the real-time data load demand of the grouped plurality of enterprise endpoint devices operated by the enterprise organization including data descriptive of the applications being executed on the grouped plurality of enterprise endpoint devices managed by the edge information handling system.

14. The method of claim 9 further comprising:
with a commerce engine, determining a maximum limit and a minimum limit of network slices to be provided to the grouped plurality of enterprise endpoint devices managed by the edge information handling system based on the client business policy.

15. The method of claim 9, wherein dynamically adjusting network slices assigned to the grouped plurality of enterprise endpoint devices at the edge information handling system includes setting a time frame when the adjustments to the provisioning of the dynamically adjusted network slices is made such that when the time frame expires, the dynamically adjusted network slices set to accommodate the load demand for the grouped plurality of enterprise endpoint devices is adjusted back to a default level based on the client business policy.

16. An edge information handling system with an on-demand network slice overlay optimization system operatively coupled to a grouped plurality of managed enterprise endpoint devices for managing access to a wireless network comprising:
- a processor;
- a memory;
- a power management unit (PMU);
- the processor executing code instructions of the on-demand network slice overlay optimization system configured to:
  - receive wireless network load profile metrics for the grouped plurality of managed enterprise endpoint devices managed by the edge information handling system;
  - receive the endpoint device load profile metrics including data descriptive of a real-time data load demand of the grouped plurality of managed enterprise endpoint devices operated by an enterprise organization and operating within the enterprise infrastructure monitored by the edge information handling system;
  - receive core metrics from a radio access network (RAN) service provider descriptive of the load capacity of a core network to provide data throughput at a given time;
- the processor executing code instructions of a commerce engine operatively coupled to the RAN service provider configured to:
  - determine whether the real-time data load demand can be provisioned with the load capacity described in the core metrics;
  - determine cost of dynamically adjusting network slices to the enterprise organization; and
- the on-demand network slice overlay optimization system dynamically adjusts network slices from an enterprise-assigned load capacity of a plurality of network slices for the enterprise organization through a wireless connection with at least one wireless base station or at least one wireless access point of a network service provider, where dynamic adjustment of network slices in the enterprise-assigned load capacity is controlled and attributed to the grouped plurality of managed enterprise endpoint devices and managed at the edge information handling system for the enterprise via instruction to a network slice selection function (NSSF) to provide for addition or subtraction of network slices for any changes in the load demand based on a client business policy provided at the edge information handling system for the grouped plurality of managed enterprise endpoint devices.

17. The information handling system claim 16 further comprising:
the processor to access the commerce engine to access the client business policy, the client business policy including:
- a description of the contractual static data bandwidth to be provided to the enterprise organization; and
- a description of an elasticity of access to the load capacity of the core network available to the grouped plurality of managed enterprise endpoint devices to which the data throughput may be expanded or contracted based on real-time data load demand.

18. The information handling system of claim 16, wherein the client business policy is referred to by the on-demand network slice overlay optimization system to determine whether data throughput may be increased by increasing the network slices attributed to the grouped plurality of managed enterprise endpoint devices managed by the edge information handling system, when the network slices attributed to the grouped plurality of managed enterprise endpoint devices managed by the edge information handling system are to be increased or decreased, to provide a notification to the enterprise organization associated with the client business policy.

19. The information handling system of claim 16 further comprising:
the real-time data load demand received from the grouped plurality of managed enterprise endpoint devices including data descriptive of the applications being executed on the grouped plurality of managed enterprise endpoint devices.

20. The information handling system of claim 16, further comprising:
the processor accessing the commerce engine to determine a maximum limit and a minimum limit of network slices to be provided to the grouped plurality of managed enterprise endpoint devices managed by the edge information handling system based on the client business policy.

* * * * *